Figure 1:
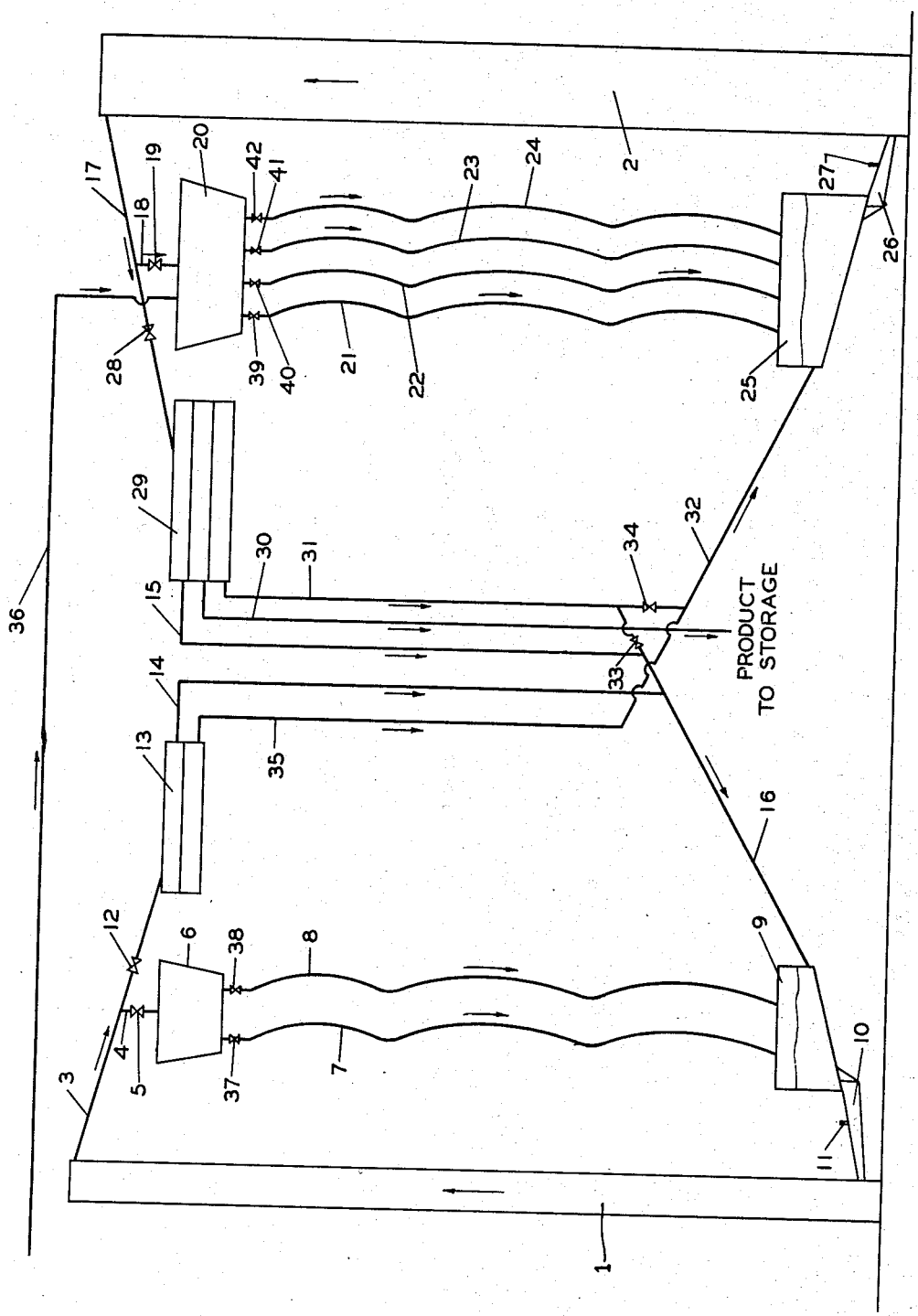

Aug. 25, 1942.    S. C. CARNEY    2,294,022
PROCESS FOR AGGLOMERATING PULVERULENT MATERIAL
Filed June 12, 1939    2 Sheets-Sheet 1

INVENTOR
S. C. CARNEY
BY
Hudson, Young, Shanley + Yinger
ATTORNEYS

Aug. 25, 1942.  S. C. CARNEY  2,294,022
PROCESS FOR AGGLOMERATING PULVERULENT MATERIAL
Filed June 12, 1939  2 Sheets-Sheet 2
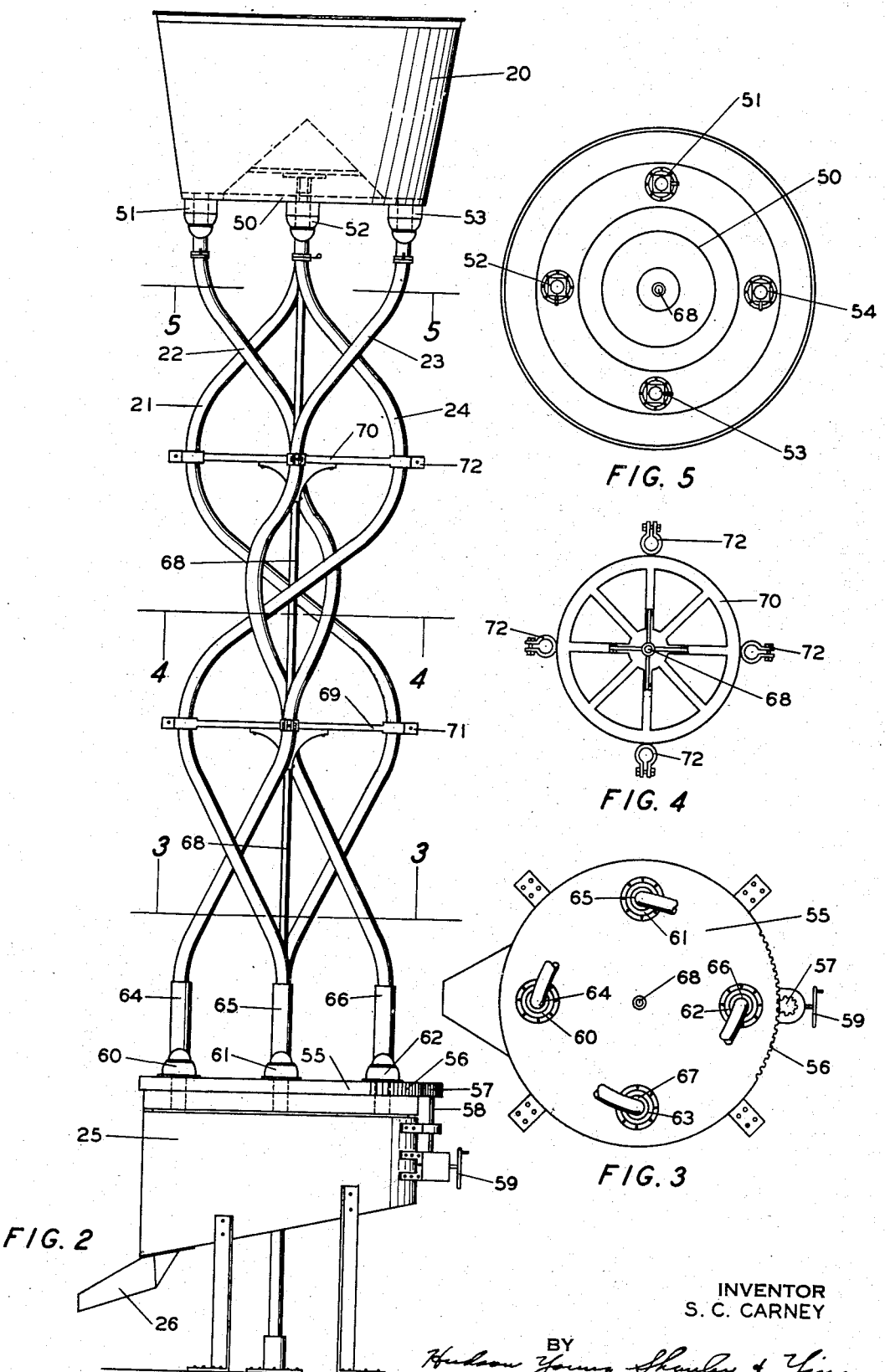
INVENTOR
S. C. CARNEY
BY
Hudson, Young, Shanley, & Yinger
ATTORNEYS Patented Aug. 25, 1942

2,294,022

UNITED STATES PATENT OFFICE 2,294,022

PROCESS FOR AGGLOMERATING PULVERULENT MATERIAL

Samuel C. Carney, Bartlesville, Okla., assignor to Phillips Petroleum Company, a corporation of Delaware Application June 12, 1939, Serial No. 278,753

5 Claims. (Cl. 23—314)

This invention relates to the art of transforming the dusty light pulverulent material as produced, into free flowing, relatively dustless, small aggregates with density of 20 pounds or more per cubic foot and is an improvement over my co-pending application, Serial No. 259,065, filed February 28, 1939.

The object of this invention is to increase the density and improve flow characteristics of pulverulent material, to cheapen and facilitate storage and handling of the material and largely to eliminate its dusting character.

It is a further object to eliminate the dusting character of carbon black without interference with the step in rubber compounding of thorough dispersion of the carbon black in the rubber batch.

The advantages of this process and apparatus over those of the prior art, including my co-pending application above mentioned are:

(1) Use of more stationary and less movable apparatus with none of it being specially built;

(2) Lower construction cost;

(3) Less horsepower to operate;

(4) The moving apparatus is a material elevator of standard type which may be bought from a stock of several builders;

(5) A much smaller amount of material is in process which causes the reduction in horsepower and facilitates changing the operation from material of one quality to another;

(6) The apparatus is readily emptied when changing from one quality of raw feed to another;

(7) Operating adjustments for controlling the granule size and density when the rate of production of raw material changes are positive and simple. Thus the pelleting process may readily be operated with variable throughput to match variable production rate, thus eliminating use of large storage tanks;

(8) Difficulty in other processes due to the coating of operating surfaces with material is eliminated.

(9) The apparatus is of such character and so simple and compact that a reduced pressure of 2 inches of water may easily be maintained within it, thus preventing escape of dust into the operating room.

The broad principle of this process is very similar to that of my prior invention above mentioned. A separate seed mill may still be used and it also may be of the type herein described instead of the rotating annulus and it still may or may not use added rubber balls to promote attrition. The mathematical laws governing growth of granules apply to this process the same as the co-pending process as to the inherent balance between the seed and pellet mill in governing amount of seed. This process is also like the co-pending process and unlike the Cabot and Huber processes in not passing through the difficult stage of converting raw feed plus fine seed into granules that will roll. For it, too, like the co-pending application adds around one pound of feed to one hundred pounds of free rolling, dense material of substantially product size.

The difference between this and all other processes including my co-pending application, is this: all former processes caused the individual granules to rotate relative to each other while the mass of granules remained relatively stationary, by moving part (as in Cabot's), or all of the apparatus (as in Huber's and my co-pending application) by use of horsepower. The rotating annulus of the co-pending application, when analyzed, may reasonably be said to be, "a curved moving passageway in which the individual granules in a mass of them are caused to rotate relative to each other by the contact of many of them with the moving walls of the passage, though the entire mass of granules remains relatively stationary."

Whereas, the others, in their action, resemble the rolling of a ball on the slope of a continuously moving treadmill, this process resembles the free rolling of a ball down a stationary slope, the ball then being picked up at the bottom, elevated to the top by use of power in a known device, and released to roll again down the same stationary slope.

As my co-pending application differed from the prior art by making the product itself the mechanism of the process, this process goes beyond it, by retaining the product as the mechanism, but by moving that product, which is acting as the mechanism, instead of moving the apparatus.

Other objects and advantages of the invention will be apparent during the course of the following description.

In the accompanying drawings, forming a part of this specification, and in which like numerals are employed to designate like parts throughout the same, Figure 1 shows diagrammatically a layout of the apparatus for carrying forward the process, Figure 2 shows a vertical view of the hoppers and down flow lines, Figure 3 is a plan view of that portion of the apparatus below the section line 3—3, Figure 4 is a plan view of that portion of the apparatus below the section line 4—4, and Figure 5 is a plan view of that portion of the apparatus above the section line 5—5.

In the drawings, wherein for the purpose of illustration, is shown a preferred embodiment of my invention, the numerals 1 and 2 represent elevators for granule material, of known commercial type and may be, as will be discussed under operation, bucket elevators, or of vertical helical screw type. The material being lifted by the elevator 1 passes by line 3, into line 4 which has the valve 5 for controlling flow, into the hopper 6. The numerals 7 and 8 represent two or more parallel down flow lines through which material flows from hopper 6 into hopper 9. As controlled by valve 11, material flows from the hopper 9 by the spout 10 into the base of the elevator 1 and is re-elevated. Although all material from the hopper 9 is re-elevated, not all of it is delivered to the hopper 6. A part, as controlled by the valve 12 flows to vibrating screen 13, by the action of which it is separated into larger and smaller granules. The larger granules flow through line 14, thence into line 16 and back into hopper 9.

The description thus far covers the cycle of the "seed mill" except that it receives, as its raw material, granules of greater than product size which enter the seed mill cycle through line 15 and proceed by line 16 to the hopper 9.

The apparatus to the right of the drawings constitutes the "pellet mill" in which the desired product is made. Here elevator 2 lifts material from its base and discharges it into line 17, then into line 18 controlled by valve 19 and thence into the hopper 20. From the hopper 20 the material flows downwardly through lines 21, 22, 23 and 24 into the hopper 25. The material leaves the bottom of the hopper 25 by the spout 26 and as controlled by valve 27, material flows to the base of the elevator 2 and is again elevated. Not all of the material elevated by the elevator 2 flows to the hopper 20. A portion, as controlled by valve 28, flows into vibrating screen 29 which separates the flow into three fractions. The fraction of larger diameter than that of the desired product flows by line 15 back to the seed mill. The intermediate fraction, which is also largest in volume, is the desired product of the entire operation and flows by line 30 to storage. That fraction with granule diameter smaller than the desired product flows by line 31 with part of the flow from line 31 going into line 16 and thence to hopper 9 of the seed mill, though alternately it may be delivered through line 32 into hopper 25 of the pellet mill, these alternate points of delivery being controlled by valves 33 and 34. There is always delivered into hopper 25 through the lines 35 and 32, the fraction of smaller size from the seed mill as separated by the vibrating screen 13. The raw material, for example carbon black from the producing plant, at its original low density, enters hopper 20 by line 36. The system will also operate if the material from line 36 enters the lines 21, 22, 23 or 24, the hopper 25 or elevator 2. It is, however, preferred to introduce it into hopper 20 as shown in the drawings.

The down flow lines 7 and 8, 21, 22, 23 and 24 constitute a vital part in the novelty of the invention. They are preferably rubber tubes or hose made in the commercial manner, but having a smooth rubber lining. They may, of course, be made of other materials, even metals. They are longer than the direct distance between 6 and 9 and between 20 and 25 and are preferably arranged in a very steep spiral or may merely be arranged in a wave-like course. Two down flow lines are disclosed from the hopper 6 to the hopper 9 and four from the hopper 20 to the hopper 25. This number has been chosen arbitrarily but some number of lines greater than one is preferred and the flow then controlled by valves 37 and 38; and valves 39, 40, 41, and 42 as will be more fully described under operation.

The principle of the prior art is to take raw material as would enter by line 36, mix it in some way with granules smaller than product size such as will flow in this process through line 31, and then by various forms of vigorous or gentle agitation assisted by compression, as by a free roller, to cause this low density mass of extremely fine particles to agglomerate and finally begin to roll.

The process of this invention avoids this transition stage common to dry processes of the prior art by initially charging the apparatus as shown with commercial granular carbon black elsewhere produced. The charge is such in amount as to fill elevators 1 and 2, hoppers 6 and 20, the downflow lines 7, 8, 21, 22, 23 and 24 (not solidly, but with free flowing material with the elevators operating at normal speed) and so that with the apparatus in normal motion a level as indicated exists in hoppers 9 and 25. The size and capacity of elevator 2 is so selected as to deliver from 50 to 100 times the weight of raw material entering per unit of time through line 36. The size and number of downflow pipes 21, 22, 23 and 24 are so selected that they will have a greater capacity for downflow than has elevator 2 for elevating. With the system initially charged, as described, and the elevator in operation, there is a very large closed cycle of free flowing granular material of the desired density. To this large flow is continuously added through line 36 the raw material which is a much smaller stream, of weight on the order of 2 per cent of that of the large cyclic stream of granular material. The angle of fall of the downflow tubes and the number of them in operation is so arranged that they flow loosely filled with the material in process. The rolling granules will agglomerate the fine raw material and increase in size. Meanwhile in the seed mill, which has a cyclic capacity less than one-fourth as great, similar granular material has been circulating without addition of raw feed to lubricate the granules and in the presence (if desired) of a small number of rubber balls. These conditions cause the opposite effect, that of attrition, rather than growth. Valve 12 is partly opened, diverting a portion of the seed stream to screen 13. The smaller granules of this fraction fall through the sieve and are delivered by lines 35 and 32 into the product cycle, furnishing additional nuclei for agglomeration.

As the volume of material in the cycle served by elevator 2 increases the level in 25 will rise and valve 28 is then partly opened, which may be done automatically, releasing to screen 29 an amount equal in weight to that of the raw material plus the seed. That part larger than the desired product flows by line 15 to supply raw material to the seed cycle. The intermediate, or product fraction, is removed as product and that part smaller than desired product is either used direct as seed (valve 34 open, valve 33 closed) or by adjustment of these valves, is sent as a whole, or in part, to the seed cycle.

With addition of new material to the seed cycle, the level in hopper 9 will rise. Valve 12 is adjusted either manually or automatically to maintain this level. These controls by levels at 25 and 9 insure that a volume of seed will be delivered to the product cycle equal to the volume delivered by the product cycle to the seed cycle. There is thus an inherent balance between them, because more seed will reduce the amount flowing through line 15 which in turn, will reduce the amount of seed flowing through line 35. This control is based on the amount flowing through line 15, but further and more delicate control of the proportion of small and medium sizes within the product range is had by manipulation of valves 33 and 34.

Unlike the batch and lineal flow processes of the prior art, which take great pains to insure that each particle has received the same treatment, this closed cycle process follows the analogy of chemical processes, where statistical averages are used to govern processing. It is, for example, possible, though highly improbable, that a particle of raw material may enter the product after only one pass through elevator 2. But, if it does so, it must be attached to a granule within the product size range which has made many passes.

The function of valve 27 is to adjust the ratio of cycle flow to raw feed flow for control of density of finished product and also to adjust the process to normal or abnormal variations in the flow of raw material in line 36, due to variations in the producing plant. Since elevator 2 can only lift what passes valve 27 and the principal supply to hopper 25 comes from elevator 2, the entire operation may be slowed down by throttling valve 27 and shutting off one or more of the tubes 21, 22, 23 or 24. In case of such an adjustment for lower throughput, the inherent balance heretofore described would reduce the volume of seed supplied, but valve 11 has the function in that case, as well as with full throughput, to reduce the severity of attrition in the seed cycle and thus to maintain constant the relative size of the seed supplied.

Unlike the prior art, whose processes are so severe and use so much power that they have as an operating trouble, periods of too much seed of too small diameter which is derived from breakage in the process, it has been learned that by continuously introducing raw feed into a closed cycle of granules of full product size, the cycling granules are so lubricated that there is not enough breakage to make the process self-seeding, as is the prior art. But, by preparing the seed separately under control, the present process can deliver a larger per cent than the prior art from the product screen 29 as finished product. Although the per cent larger than the desired product may be reduced by fitting a smaller mesh screen in 13, it is preferred to separate there and use as seed, material nearly or quite of the same maximum size as the product. The granules, for example, of size between 28 mesh and 14 mesh which flow through line 15 do not represent a loss of effort but are an extremely important factor in promoting the rolling flow that gives rapid agglomeration. In fact, they may logically be considered as the "ball bearings" of the process.

The process here described is entirely inoperative if there were in the agglomerating cycle only the small seed of around 60 mesh and smaller of the prior art, together with the raw feed. It is the continuous maintenance there of around 90 per cent by weight of granules from 60 mesh up to around 14 mesh that makes it operative. It has also been discovered that 14 mesh is the practical limit of growth under the conditions described. This is thought to be due to the fact that the growth is at the surface and to the geometrical fact that a volume of granules each of diameter 3 units has but one-third the total surface of that volume each with diameter 1 unit, but each larger granule has 27 times the volume of each smaller granule. So it is pointed out that there is no reason except statistical probability why any individual granule in the product cycle will escape from it through valve 28. But so large is the number of granules concerned, that the principle may be used as it is in chemical plants.

The reason for using rubber downflow tubes is that their inner surface better promotes rotation in the flowing granules than does metal and further carbon does not stick to them; both because they are rubber and because they flex slightly with no harm to the tube, whereas flexed metal will crystallize and break. Shutdowns to clean apparatus are thus avoided together with the flaking off into the product of relatively large carbon scales which occur with metal equipment.

A change from one quality of raw material to another is very easily accomplished. It is only necessary to cut off the feed, close valves 5 and 19 slowly and the apparatus will empty itself. It is then recharged with granulated black of the desired quality, the new feed admitted and the valves 5 and 19 reopened.

There is an advantage in principle, if elevators 1 and 2 be of the vertical helical screw type, in that motion of the granules relative to each other is continued, and under some pressure, during this part of the cycle. This type of elevator requires more power than the bucket type of equal capacity and must also run completely filled. With this type, the items shown as valves 11 and 27 become the controls of a speed changing device controlling the elevation.

As a practical matter, the tubes 7, 8, 21, 22, 23 and 24 should be of reasonably small diameter ranging from 4 to 10 inches, a sufficient number being used in parallel to carry the required flow. The reason is to expose to the flow a sufficient rubber surface to impart the necessary rotary motion. It is repeated that in this process it is absolutely essential that the large cyclic flow consist chiefly of granules whose size lies within the product range with, preferably, around 5 per cent of its size greater than the maximum product size.

A reasonable size for an operating unit is one to process 10 pounds per minute of raw feed or 14,400 pounds per day. Taking a cyclic flow of 100 to 1, which in most cases is more than required, gives a cycle flow in the pellet mill of 1,000 pounds per minute or 30 tons per hour. Thirty feet is a practical height for elevation, though this it not a critical matter. Power formula for bucket elevators is H. P. at the motor equals $$\frac{\text{Tons/hr.} \times \text{head}}{550} \text{ so } \frac{30 \times 30}{550} \text{ equals } 1.63 \text{ H. P.}$$

or 1,000 pounds per minute to 30 foot head is 30,000 foot pounds per minute.

These horsepower figures are given because some with whom the matter has been discussed thing a 100 to 1 cycle ratio seems highly excessive and 30 tons per hour looks like just too much black to recycle. But it is obvious that something which can be done by use of just 2 horsepower is not at all unreasonable. With vertical screw type elevator, horsepower for a given flow is somewhat greater, but the recycle ratio is reduced by an amount more than compensating.

Since the processes of the prior art are self-seeding, there has grown in the trade the opinion that this is an advantageous feature. Though it is not agreed that this is so in principle, because it involves a decrease in the extent of the operator's control over the finer details of the product, it is agreed that for simplicity and reduced construction cost, one usually makes some compromise with the ideal principle. Having described the making of seed in apparatus under separate control, it is now disclosed that the present process is satisfactorily operative in a self-seeding manner by doing anything to the operation which will promote breakage of some of the granules. Whatever is done, should be of an adjustable character. Flowing the material over wire screen is known in the art. A controlled portion of the cycle stream may be diverted through any type of grinding mill and such a mill may itself be adjusted for coarse or fine grinding.

This being a closed cycle process, time of residence therefore becomes an essential point. In computing this time, only zones of activity may be considered, residence in a hopper or in the cups of an elevator increases actual but not effective, residence time. Time in a helical screw elevator does count because there the granules continue their motion relative to each other.

But although residence time in this process is more effective, it is conservative figuring to consider the cubic capacity of the rubber tubes as the effective equivalent of the 90 degrees of active volume in a rotating cylindrical annulus. These annuli have been figured on the conservative basis of supplying feed equal to 1/10 per cent by weight of their content for each revolution.

On this basis a 16,000 pound per day annular unit would have, as 90 degrees of its annular space, 55.5 cu. ft. which corresponds with .069 day or 100 minutes residence time. To give the present process the same active volume, and therefore the same residence time, a 16,000 pound plant of the present process requires 8–6 inch inside diameter rubber tubes of 35 foot length or 5 of 8-inch diameter and 32 feet long.

Two properties of these tubes must therefore be considered:

(1) Their volumetric capacity, which governs the statistical number of passes through them at any given ratio of feed to cycle flow, and (2) Their flow capacity, for permitting the rolling down of the cyclic material handled by the elevator.

The volumetric capacity may be varied by means of the shutoff valves 39, 40, 41, and 42 already shown in the disclosure, by cutting out of use one or more tubes. This gives an adjustable control over time of residence which is not available in my co-pending application or in Huber's process.

It will be quite plain that the sum of the flow capacities of the tubes in use must, at least, equal that of the elevator but this is a mere obvious quantitative requirement. The more obscure qualitative requirement is much more important. That is, that the granules must roll down, and not slide. This desirable rolling motion is complicated by the fact, usually overlooked, that to roll a foot on a plane surface without slippage, a 100 mesh granule has to make roughly 700 revolutions, while a 14 mesh granule will make it in about 85. A little thought will conceive anyone that large granules roll more readily than small ones and that small ones will only roll at all, at relatively low speed. One foot per second is only about 2/3 of a mile per hour, but for a small granule to make 700, or even 85, revolutions per second while rolling a foot is clearly quite doubtful.

It is for this reason that the present process works with granules of full product size and larger always present in all parts of the apparatus. But of course only a very small proportion of the granules present are in contact with the walls of the apparatus at any time so the rotary effect is almost entirely due to the tangent contact of granules with others which are rotating.

By long and careful observation it has been learned from experiments with both metal and rubber apparatus that the desirable type of motion which produces a good product quickly can be identified by the sense of hearing. This sound when heard, is very characteristic and can easily be learned by an operator, and like so many similar things in industry, an operator's judgment of this sound will rapidly improve with experience.

When using rubber tubes as described here, it will also be plain that their slope is a matter of prime importance. If their only function were to move the material downward, it would clearly be best to arrange them vertically. But it will be equally clear that vertical arrangement is not the best way to induce rolling. A steep spiral is the best arrangement but it is very desirable that there be a means of adjustment of this spiral angle of slope so that the operator may be able to use the knowledge he gains by the experience of repeatedly testing the product for size and density. The slope must be such as to separate the granules slightly in space, thus giving them a short "mean free path" of travel relative to each other. My impression of what happens is that rotary motion is imparted to the mass chiefly by the larger sizes and the repeated collisions between individuals, due to their slight separation, serves, not only to compact them but also to communicate rotary motion. The sound of a desirable condition is a sort of hiss, its tone quality rather than its musical pitch being changed by change in the relative proportion of different sizes present. Too large a proportion of amorphous feed, or of fine seed, deadens the sound and this indicates slow agglomeration and low density. When only small particles are present (100 to 60 mesh, for example), sound can scarcely be heard, even when particles are truly granular; and the desirable rotary motion is very difficult to attain. This explains the long residence time required by a lineal flow process. A rubber surface better communicates rotation to the larger granules and even when using the relatively larger 8 inch or 10 inch tubes mentioned, the rubber surface contacted is far greater than the metallic surfaces of the apparatus of the prior art. The spiral arrangement continuously changes the location of the bottoms of the tubes and by holding the diameter of the spiral constant, its lineal slope will be constant throughout its length, even when that slope be changed by giving the spiral a larger or smaller number of turns as by use of the adjusting mechanism here described or its equivalent.

No great change in the number of turns of a spiral is necessary to change its inclination within the range desirable in this process. This may be seen from the fact that in a spiral with 30 feet length and 2 feet diameter, the angle of slope when it has four turns is only about 45 degrees. Since the angle of repose of the material is around 35 degrees, 45 is lower than will generally be used. Thus a change of four turns (and with larger diameter of the spiral even less) will cover the range of slope between 45 degrees and the vertical. By working in the direction of lower angle of slope, the operator can make a reasonable lowering in the angle of repose of the product, though the size and character of seed has more influence on this quality of the product.

Figures 2-5 show the details of the down flow tubes and also show an adjusting arrangement to vary the slope of the hose members. The numeral 50 represents the bottom of the upper feed hopper 20 and is shown in plan in Figure 5. It is of circular shape and stationary with the rubber tubes 21, 22, 23 and 24 connected to it by means of ball and socket joints 51, 52, 53 and 54, so that the connection is free to rotate or to change its angular direction. A circular plate 55 is located at the top of the lower hopper. It is circular and of the same diameter as the plate 50 and it is so mounted that it may be rotated by a worm or gear arrangement. The plate 55 has the gear 56 on its outer edge and the gear wheel 57 meshes with the gears 56 on the plate 55. A shaft 58 and wheel 59 connect with the gear wheel 57 to turn the plate 55.

The delivery ends of the hose are connected into openings near the edge of the plate 55 also by movable joints 60, 61, 62 and 63 except 64, 65, 66 and 67 represent telescopic joints in addition to the ball and socket joints. The telescopic joints 64, 65, 66 and 67 are of metal but rubber lined and are capable of extension in length of about 4 feet.

A stationary mast of 2 inch pipe 68, for example, extends between the centers of plates 50 and 55. Its function is solely to align the guides 69 and 70 which are loosely mounted on the stationary mast 68, free to rotate about it or move up and down. Their only function is to guide and space the rubber tubes and to hold constant the diameter of the spiral in which the tubes are arranged. Any suitable number of such members 69 and 70 are used depending on the distance between 50 and 55. To the edges of 69 and 70 are loosely attached as by a swivel joint, clamps 71 and 72. By their attachment to the plurality of tubes, these clamps hold the spacing members 69 and 70 in their relative positions.

Plate 55 is arranged to be rotated by the gear mechanism 56, 57, 58 and 59. Though probably unnecessary, it is explained that such rotation is not constant but is only a means for adjustment by the operator of the slope of the spiral. To do this the operator may occasionally rotate disc 55, for example, one-quarter or one-half revolution, either forward or backward. If he turns it in a direction to increase the number of turns in the spiral, the rubber members will have to lengthen and this is the function of the telescopic joints 64, 65, 66 and 67 with which each of the tubes is equipped. It is noted that four feet of change in the length of tubes is sufficient for all desirable adjustments in slope when the diameter of the spiral is 2 feet and the distance between plates 50 and 55 is 30 feet.

It is to be understood that the form of my invention, herewith shown and described, is to be taken as a preferred example of the same, and that various changes in the shape, size and arrangement of parts may be resorted to without departing from the spirit of my invention or the scope of the subjoined claims.

Having thus described my invention, I claim:

1. The method of making dry granular carbon black in a continuous closed cycle which comprises continuously pouring a stream of free flowing carbon granules into the top of a confined space enclosed by a sharply sloping surface, allowing the said free flowing carbon granules to flow down the said confined space, removing the stream of free flowing carbon granules from the bottom of the confined space and returning it to the top of the confined space to complete the cycle, adding raw carbon black to the stream of granules at the top of the confined space, removing from the cyclic flow as product an amount of granules equal to the weight of raw carbon black added to the cycle, the said raw carbon black added per cycle being in the approximate ratio of 1:100 to the total carbon black in the cyclic flow.

2. The method of making dry granular carbon black in a continuous closed cycle which comprises continuously pouring a stream of free flowing carbon granules into the top of a confined space enclosed by a sharply sloping surface, allowing the said free flowing carbon granules to flow down the said confined space, removing the stream of free flowing carbon granules from the bottom of the confined space and returning it to the top of the confined space to complete the cycle, adding raw carbon black to the stream of granules at the top of the confined space, removing from the cyclic flow as product an amount of granules equal to the weight of raw carbon black added to the cycle, the said raw carbon black added per cycle being within the approximate ratio limits of from 1:50 to 1:100 to the total carbon black in the cyclic flow.

3. The method of making dry granular carbon black in a continuous closed cycle which comprises continuously pouring a stream of free flowing carbon granules into the top of a confined space enclosed by a sharply sloping surface, the stream of free flowing carbon granules comprising approximately 90 per cent by weight of granules from 60 mesh to 14 mesh in size, allowing the said free flowing carbon granules to flow down the said confined space, removing the stream of free flowing carbon granules from the bottom of the confined space and returning it to the top of the confined space to complete the cycle, adding raw carbon black to the stream of granules at the top of the confined space, removing from the cyclic flow as product an amount of granules equal to the weight of raw carbon black added to the cycle, the said raw carbon black added per cycle being within the approximate ratio limits of from 1:50 to 1:100 to the total carbon black in the cyclic flow.

4. The method of making dry granular carbon black in a continuous closed cycle which comprises continuously pouring a stream of free flowing carbon granules into the top of a confined space enclosed by a sharply sloping surface, allowing the said free flowing carbon granules to flow down the said confined space, removing the stream of free flowing carbon granules from the bottom of the confined space and returning it to the top of the confined space to complete the cycle, adding raw carbon black to the stream of granules at the top of the confined space, removing from the cyclic flow as product an amount of granules equal to the weight of the raw carbon black added to the cycle, the said raw carbon black added per cycle being within the approximate ratio limits of from 1:50 to 1:100 to the total carbon black in the cyclic flow, and continuously adding a sufficient supply of granules of small diameter to balance the growth of the granules in cyclic flow from the addition of the raw carbon black to maintain the average diameter of the granules retained in the process substantially constant.

5. The method of making dry granular carbon black in a continuous closed cycle which comprises continuously pouring a stream of free flowing carbon granules into the top of a confined space enclosed by a sharply sloping surface, the stream of free flowing carbon granules comprising approximately 90 per cent by weight of granules from 60 mesh to 14 mesh in size, allowing the said free flowing carbon granules to flow down the said confined space, removing the stream of free flowing carbon granules from the bottom of the confined space and returning it to the top of the confined space to complete the cycle, adding raw carbon black to the stream of granules at the top of the confined space, removing from the cyclic flow as product an amount of granules equal to the weight of raw carbon black added to the cycle, the said raw carbon black added per cycle being within the approximate ratio limits of from 1:50 to 1:100 to the total carbon black in the cyclic flow, and continuously adding a sufficient supply of granules of small diameter to balance the growth of the granules in cyclic flow from the addition of the raw carbon black to maintain the average diameter of the granules retained in the process substantially constant.

SAMUEL C. CARNEY.